United States Patent [19]
Dirk

[11] Patent Number: 5,573,319
[45] Date of Patent: Nov. 12, 1996

[54] TRANSFORMER CABINET HAVING FORMED CHANNEL EDGES

[75] Inventor: Neal Dirk, Whitefish Bay, Wis.

[73] Assignee: Cooper Industries, Inc., Houston, Tex.

[21] Appl. No.: 411,482

[22] Filed: Mar. 28, 1995

[51] Int. Cl.$^6$ .................................................. A47B 81/00
[52] U.S. Cl. ...................... 312/100; 312/223.1; 312/327; 312/328; 174/52.1; 52/27
[58] Field of Search ............................ 312/100, 223.1, 312/327, 328; 174/52.1; 52/27

[56] References Cited

U.S. PATENT DOCUMENTS

| | | | |
|---|---|---|---|
| 3,210,456 | 10/1965 | Skubal | 174/16 |
| 3,365,535 | 1/1968 | Wilk | 174/50 |
| 3,514,172 | 5/1970 | Buchman | 312/215 |
| 3,784,727 | 1/1974 | Maubein | 174/52 R |
| 3,841,032 | 10/1974 | Grannis, III | 52/27 |
| 4,426,120 | 1/1984 | Johnson et al. | 312/100 |
| 4,559,699 | 12/1985 | Owen et al. | 29/602 R |
| 5,189,257 | 2/1993 | Borgmeyer | 174/52.1 X |
| 5,441,468 | 8/1995 | Deckers et al. | 482/54 |
| 5,449,267 | 9/1995 | Ablabutyan | 414/540 |

Primary Examiner—Peter M. Cuomo
Assistant Examiner—Stephen Vu
Attorney, Agent, or Firm—Conley, Rose & Tayon, P.C.

[57] ABSTRACT

A tamper-resistant transformer cabinet is provided, comprising: a tank including a front plate, for housing said transformer, said front plate including upper, lower and side edges, a riser extending from said front plate, said riser including two sides and a front, a cabinet door including a rear top edge, two rear side edges, two lower side edges, and a lower front edge, said door including along each of said edges a pair of 90° bends that form a channel, said channel forming a tamper-resistant interface between said door and said tank.

20 Claims, 9 Drawing Sheets

TRANSFORMER CABINET HAVING FORMED CHANNEL EDGES

TECHNICAL FIELD OF THE INVENTION

The invention relates in general to cabinets for electrical transformers, and more specifically to cabinets for transformers of the padmount type. Still more particularly, the present invention comprises a cabinet door having a multi-angled formed edge that forms an improved interface with the transformer tank.

BACKGROUND OF THE INVENTION

In electrical power distribution systems, distribution transformers are used to step down voltage between the high voltage power line and the user. Hence, transformers are present at virtually every distribution point. Transformers are typically mounted above ground on a junction pole, or at ground level on a pad or platform. The increased use of underground power distribution systems has resulted in a corresponding increase in the number of pad-mounted transformers. Pad-mounted transformers must be contained in a manner that will prevent tampering by unauthorized individuals. Typically, this is accomplished by enclosing the high voltage and low voltage termination components of the transformer within a metal cabinet. The transformer includes a tank, which contains the core and coil assembly immersed in oil, and a cabinet, which includes a top hinged door and a bolted in place sill. Connections for incorporating the transformer assembly into the power distribution system extend through one wall of the tank and are enclosed by the cabinet. In order to provide utility personnel the necessary access to the transformer connections the cabinet must include a door. Conventionally, such cabinet doors are three-dimensional, comprising a front, two sides and a top and are typically formed in two pieces, which are welded together. The cabinet door is pivotally attached to the tank along the top edge of the front plate of the tank. The cabinet also includes a low sill extending forward from the transformer tank, upon which the cabinet door rests when closed.

As a result of this construction, a tamper proof interface must be provided along the three rear edges (two sides, top) where the door interfaces with the tank, and along the three lower edges (two sides, front) where the door interfaces with the sill. The interface must be able to withstand the attempted insertion of wire probes or other objects. In addition, the cabinet door must be rigid enough to withstand attempts to pry open the cabinet. Standards for tamper and pry resistance are set by ANSI.

Conventional transformer cabinet doors include a plurality of plastic or metal tamper strips mounted along the inside of the edges of the door. The strips are often mitered and notched so as to fit together and form a continuous tamper strip around the inner edge of the door. The purpose of the tamper strips is to prevent wire probes or other foreign objects from being inserted into the space between the door and the tank or sill and, to a lesser extent, to stiffen or strengthen the door so that it resists efforts to pry it open.

Conventional tamper strips come in a kit comprising one each of several linear strips. The strips are not interchangeable and each strip must be mounted in the proper position and in the proper order on the cabinet door. Plastic strips are affixed to the door by means of welded on studs or bolts and hardware comprised of speednuts or flat and lock washers and hex nuts. Metal strips may be affixed by tack welding. Metal strips may be affixed to the door prior to painting, while plastic strips are typically applied after the cabinet door has been assembled and painted. The mounting of the strips on the cabinet door comprises a significant additional manufacturing step in terms of labor and time. The hardware or welds that are used to affix the strips to the cabinet door form initiation points for corrosion. Also, the interface between the strips and the door to which they are attached forms a small gap into which water can be drawn by capillary action, resulting in increased corrosion. Furthemore, if the strips are tack-welded this gap may be difficult to paint.

U.S. Pat. No. 4,559,699 to Owen et al. discloses a cover/tank interface that consists of two equal opposite facing acute angles in the cover and a single obtuse angle in the adjacent tank, with the obtuse angle being substantially equal to 180° minus the value of one acute angle. Closure of the terminal cover causes a leg of the obtuse angle to be received in the notch formed by the second acute angle. Fabrication of such a cover/tank interface is difficult, however, as close tolerances must be maintained around the entire interface. Also, the "V" shaped grooved formed in this manner is difficult to coat with paint or other protective coating.

Hence, it is desired to provide a means for preventing prying of the door with respect to the sill and tank or the insertion of foreign objects into the interface therebetween, which does not require an additional manufacturing step or the affixation of non-metal parts to the metal door. It is further desired to provide a cabinet door that is easily manufactured yet forms an interface with the sill and tank and meets the tamper-proofing standards required by ANSI.

SUMMARY OF THE INVENTION

Briefly, the present invention is a new and improved padmounted transformer cabinet having door/tank and door/sill interfaces that improve the tamper-resistance of the cabinet while at the same time improving corrosion resistance and reducing manufacturing cost. The tamper-resistance is improved by an interface configuration which: (a) presents difficulty in pry opening and leverage points (b) presents a tortuous path to wire probes and other inserted objects, and (c) deflects wire out of the enclosure at an interface corner, when wire is pushed along the seam of the interface. The interface improves corrosion resistance by eliminating: (a) welding of the interface components, (b) hidden door surfaces under tamper strips which prevent paint coverage, (c) metal-to-metal or plastic-to-metal overlays which trap moisture and (d) the attachment of additional pieces to the door. The new and improved interface reduces manufacturing cost because the interface is formed from the edges of the door itself, the bends are simple and few, no labor is required for the attachment of additional pieces and the construction enables automated manufacturing.

The door/sill interface can be made such that the entire door bottom edge extends in front of and against the front surface of the sill to prevent corrosion by directing moisture and contaminants away from the door/sill interface directly to the ground and thereby preventing these contaminants from collecting on a ledge between the sill and lower door edge. According to an alternative embodiment, the invention also prevents corrosion by allowing condensation on the inside of the door to be directed to the lower door edge, out condensation weepholes, and away from the door/sill interface.

Other objects and advantages of the invention will appear from the following description.

FIGURES

For a detailed description of a preferred embodiment of the invention, reference will now be made to the accompanying drawings wherein.

DETAILED DESCRIPTION OF THE INVENTION

Figure 1:
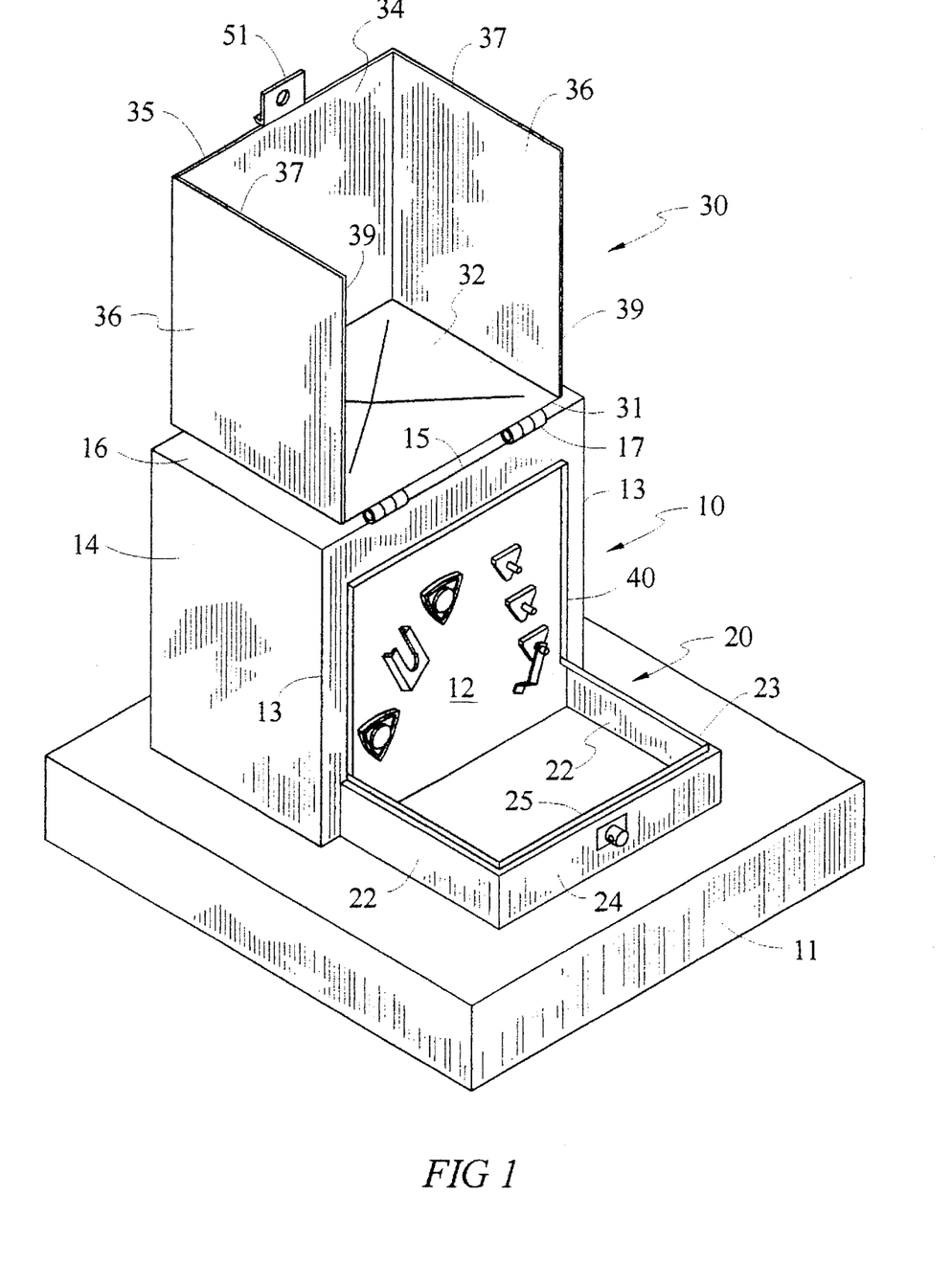
FIG. 1 is a perspective view of a transformer cabinet with its door in an open position.

Referring initially to FIG. 1, a transformer core and coil assembly (not shown) is typically housed in a tank 10 having a front plate 12, sides 14, and top 16. Tank 10 typically houses the core and coil assembly immersed in oil and includes various electrical fittings and components connected to the transformer and extending through front plate 12. Front plate 12 includes side edges 13 and a top edge 15. Front plate 12 typically also includes around its periphery a reinforcing metal stiffener 40 having a bar, angle or teardrop shaped cross section. Stiffener 40 is formed when front plate 12 is formed by bending the material of front plate 12 approximately one inch from the edge into the desired shape. Stiffener 40 extends around front plate 12 adjacent side and top edges 13, 15, respectively.

Extending from the bottom of side edges 13 is a sill, or riser, 20 that includes sides 22 and a front 24. Sill 20 is typically formed from a single piece of metal that is bent into the desired shape. Tank 10 and riser 20 typically rest on a concrete, fiberglass or plastic transformer pad 11 and are affixed thereto by bolts or the like.

Figure 2:
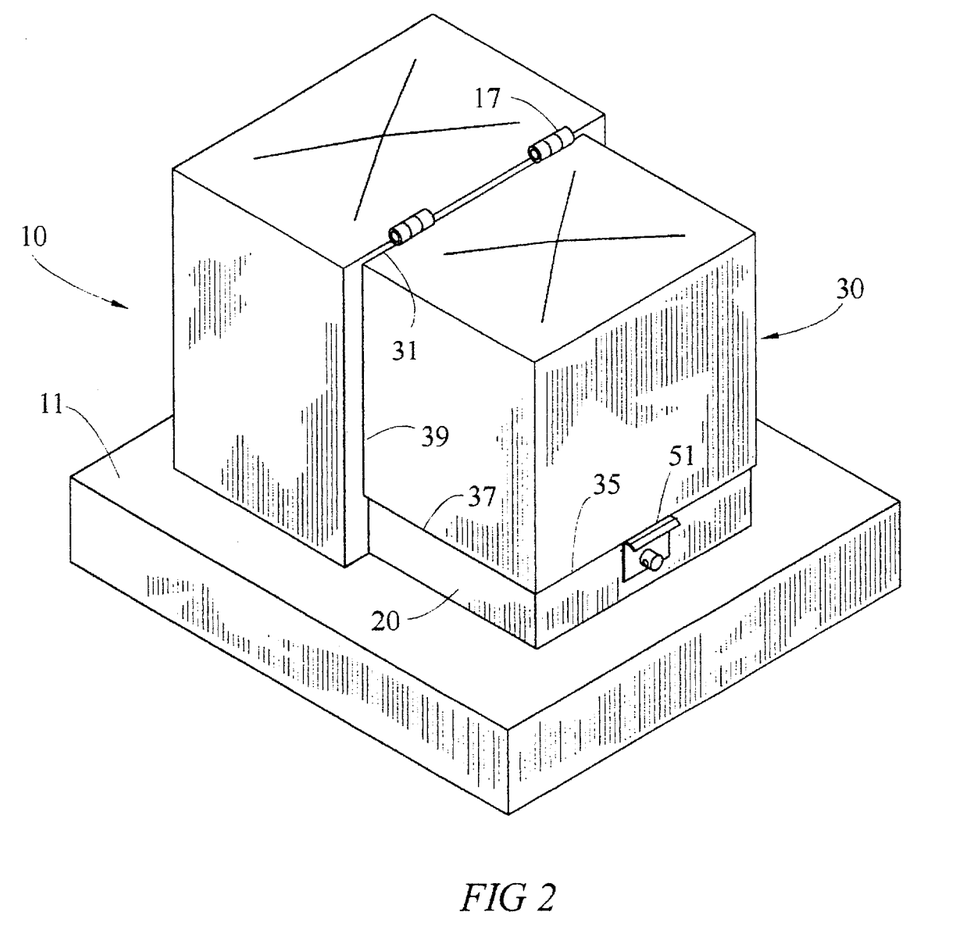
FIG. 2 is a perspective view of the transformer cabinet of FIG. 1 with its door in a closed position.

A cabinet door 30 is pivotally attached to upper edge 15 of front plate 12 by means of hinges 17 or the like. Cabinet door 30 includes a top panel 32, a front panel 34, and two side panels 36. Front and side panels 34, 36 are typically formed from a single piece of metal that is bent into the desired shape, to which top panel 32 is attached. Cabinet door sides 36 include lower side edges 37 and rear side edges 39. Cabinet door front panel 34 includes a lower front edge 35, and cabinet door top panel 32 includes a rear top edge 31. A conventional locking latch 38 and handle 51 are affixed to the lower edge of front panel 34, as discussed in greater detail below. Cabinet door 30 is configured to complement the space defined by riser 20 and front plate 12, so that when door 30 is closed, as shown in FIG. 2, it rests on riser 20 and forms an interface with the tank and riser along edges 31, 39, 35 and 37. In this manner, door 30 encloses the electrical components extending through front plate 12. Because the purpose of cabinet door 30 is to prevent unauthorized access to the transformer components, it is necessary that the interfaces between the cabinet door 30 and tank 10 and riser 20 be tamper-proof.

Thus, the interfaces between rear edge 31 and upper edge 15, between rear edges 39 and side edges 13, between lower edges 37 and upper edges 23, and between lower edge 35 and upper edge 25 must all conform to standardized tamper-proofing requirements. At present, the door is stiffened and tamper-proof interfaces between cabinet door 30 and tank 10 and riser 20 are created by bolting or welding a plurality of plastic or metal tamper-proofing strips to the various edges of door 30. According to the present invention, tamper strips 42 are eliminated and cabinet door 30 is modified as discussed below, so as to provide the necessary tamper proofing.

Figure 3:
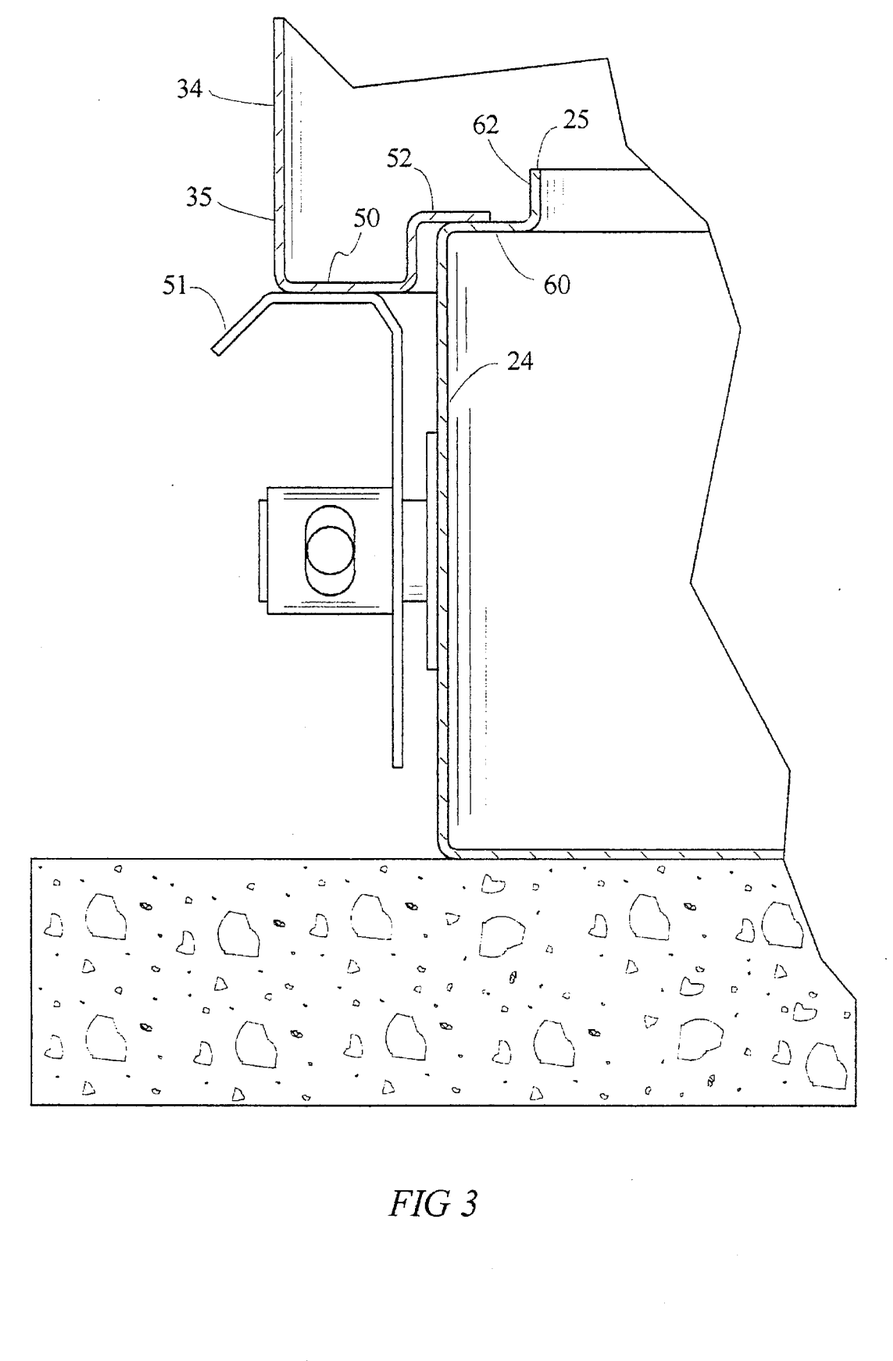
FIG. 3 is a cross-sectional view of the interface at the lower front edge of a cabinet door constructed according to the present invention.

Referring now to FIGS. 3-7, according to the present invention all of the edges of cabinet door 30 with the exception of rear top edge 31 include three 90° bends forming a channel and a lip. Referring for example to FIG. 3, lower edge 35 of front panel 34 includes a channel 50 and a flange 52. According to the present invention, the top edge 23 of riser 20 includes a pair of 90° bends forming a shoulder 60 and a vertical lip 62. Flange 52 of lower edge of front panel 34 rests on shoulder 60, while channel 50 extends in front of and slightly beyond shoulder 60. Handle 51 is affixed to the lower face of channel 50, preferably by welding or the like, and extends in front of panel 24 as shown.

Figure 4:
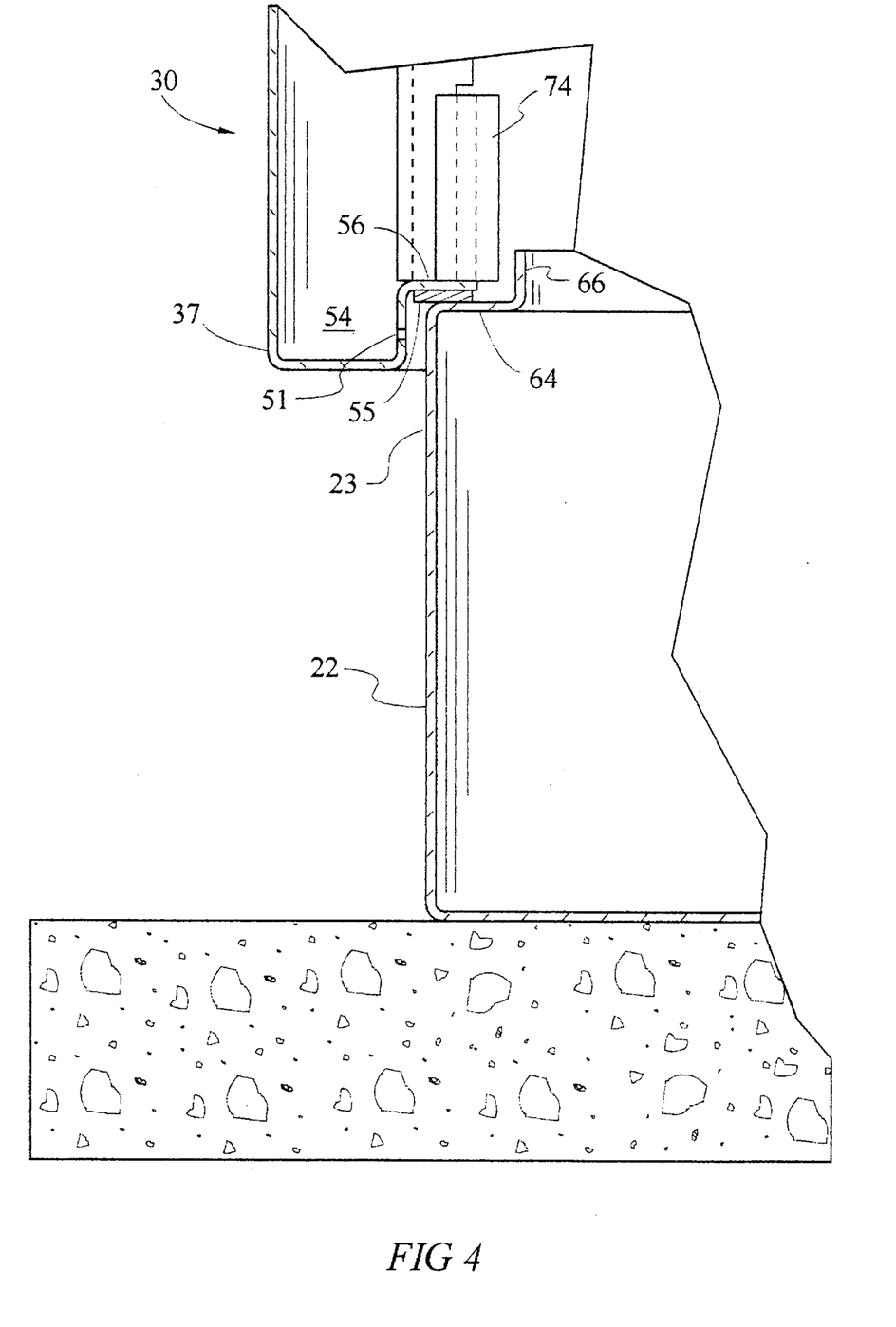
FIG. 4 is a cross-sectional view of the interface at the lower side edge of a cabinet door constructed according to the present invention.

Referring now to FIG. 4, the interface between lower edge 37 of side panel 36 and upper edge 23 of riser 20 resembles the interface between lower edge 35 and top edges 23. As on lower front edge 35, lower side edge 37 includes a channel 54 and a substantially horizontal flange 56. Similarly, the upper edge 23 of riser 20 includes a shoulder 64 and a vertical lip 66. Unlike the front interface, however, flange 56 does not rest on shoulder 64 in the preferred embodiment. Instead, there is a small clearance between flange 56 and shoulder 64 which may include a resilient bumper material 55 affixed to flange 56, as desired. Construction of the lower interface in this matter ensures a firm seating of forward flange 52 on shoulder 60 without requiting extreme tolerances in the construction of the side panels. When the lower edge of the cabinet door 30 extends beyond upper edge 23 of riser 20 in this manner, water running down the outside of the cabinet will be directed away from the door/sill interface, resulting in reduced corrosion.

According to an alternative preferred embodiment, at least one weephole 51 can be drilled though the inner leg of channel 54, for allowing moisture that condenses on the inside wall of door 30 to drain out and down the outside of sill 20.

Figure 5:
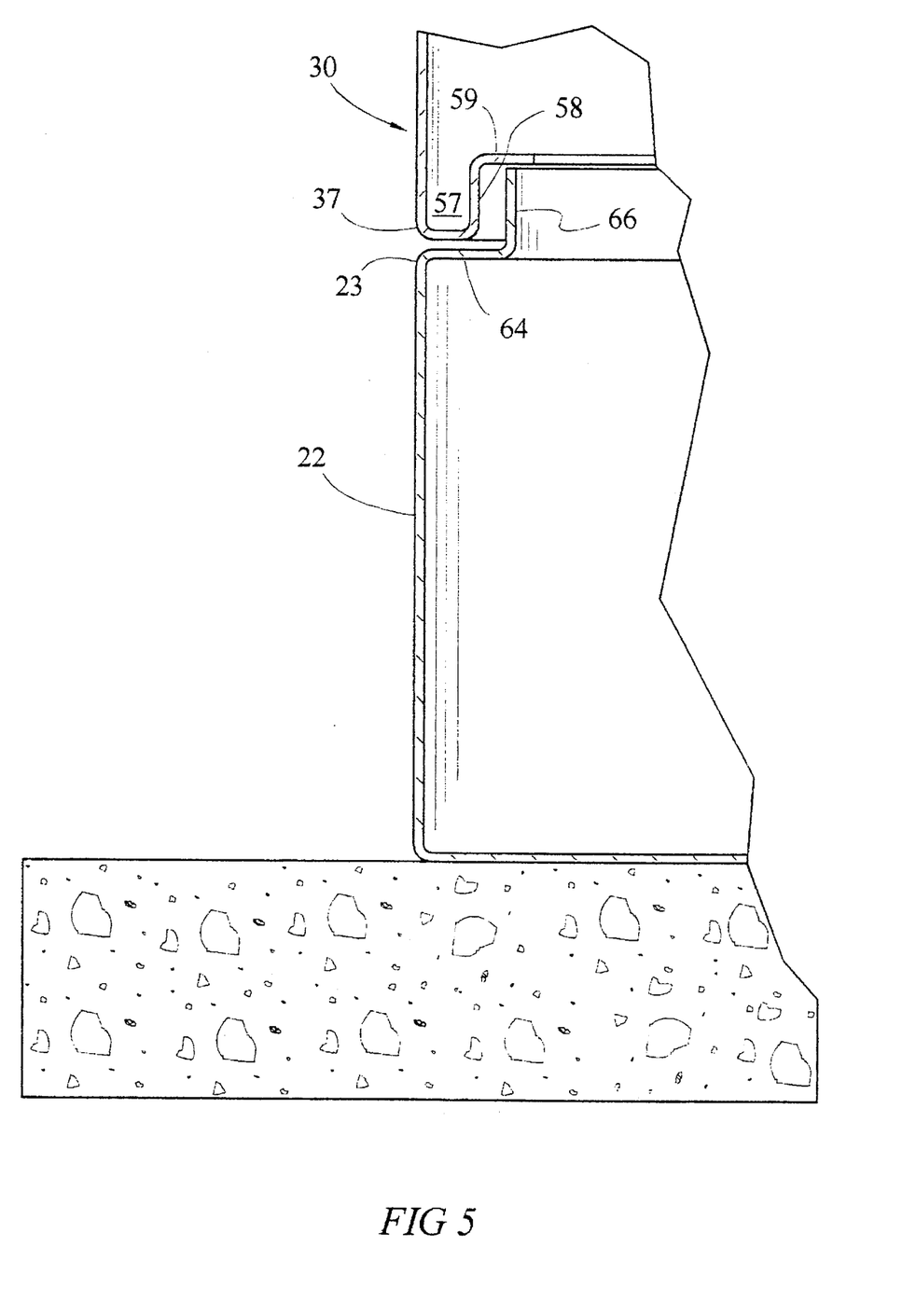
FIG. 5 is a cross-sectional view of an alternative embodiment of the interface shown in FIG. 4.

Referring now to FIG. 5, an alternative embodiment of the interface between lower edge 37 of side panel 36 and upper edge 23 of riser 20 is shown. According to this embodiment, lower side edge 37 includes a channel 57 and a substantially horizontal flange 59, with a channel sidewall 58 therebetween. The embodiment shown in FIG. 5 differs from that shown in FIG. 4 in that the door and channel have been modified so that the bottom of channel 57 faces shoulder 64 of sill 20, rather than overhanging it. Similarly, channel sidewall 58 is dimensioned so that flange 59 fits over lip 66. As in FIG. 4, flange 59 does not rest on lip 66 and channel 57 does not rest on shoulder 64 in the preferred embodiment. Instead, there is a small clearance which may include a resilient bumper material (not shown) affixed to the bottom of channel 57, as desired. Construction of the lower interface in this matter ensures a firm seating of forward flange 52 on shoulder 60 without requiring extreme tolerances in the construction of the side panels.

Figure 6:
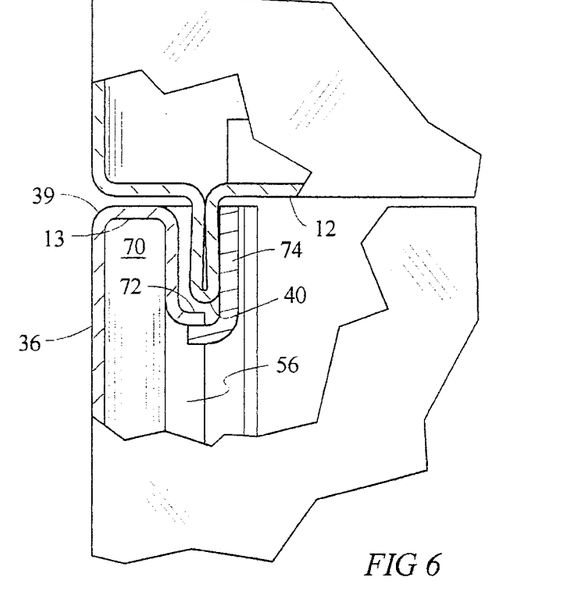
FIG. 6 is a cross-sectional view of the interface at the lower end of the rear side edge of a cabinet door constructed according to the present invention.

Referring now to FIG. 6, the lower end of the rear edge 39 of door side panel 36 is shown in an engaged relationship with the teardrop shaped stiffener 40 along side edge 13 of front plate 12. While the present invention is shown with a teardrop shaped stiffener, it will be understood by those skilled in the art that the present invention can be used in conjunction with front plates having stiffeners of other shapes without departing from the spirit of the invention. As on the lower edge of door 30, the rear side edges also include three 90° bends so that a channel 70 and a flange 72 are formed. The depth of channel 70 preferably corresponds to the height of teardrop stiffener 40, so that when the door closes and rear edge 39 is brought into proximity with front plate 12, flange 72 abuts stiffener 40 and the bottom of channel 70 abuts front plate 12.

Figure 9A:
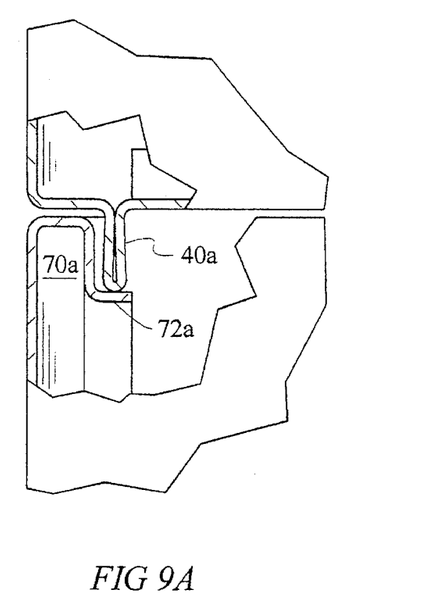
FIG. 9A is a cross-sectional view of the interface at an upper portion of the rear side edge of a cabinet door constructed according to the present invention.
Figure 9B:
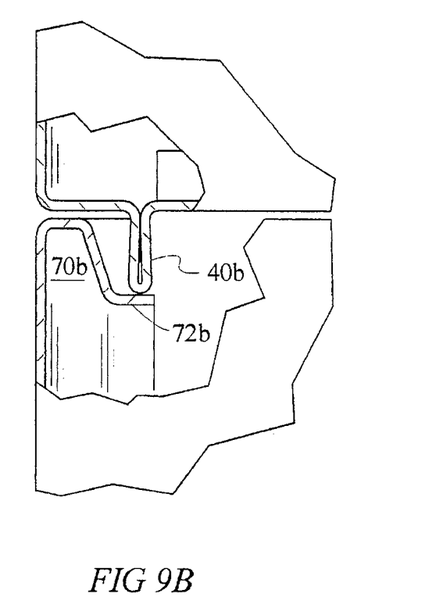
FIG. 9B-H are cross-sectional views of alternative embodiments of the rear side interface shown in FIG. 6.
Figure 9C:
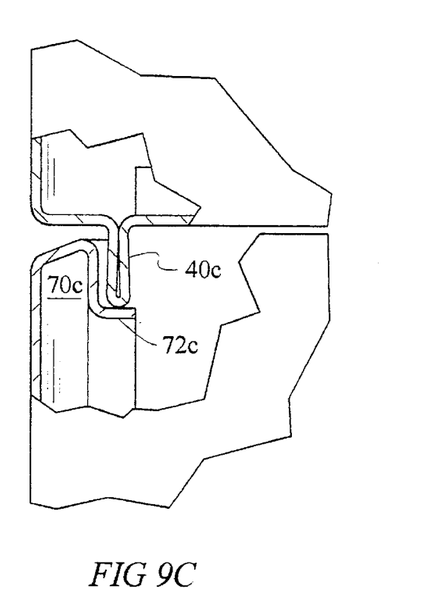
Figure 9D:
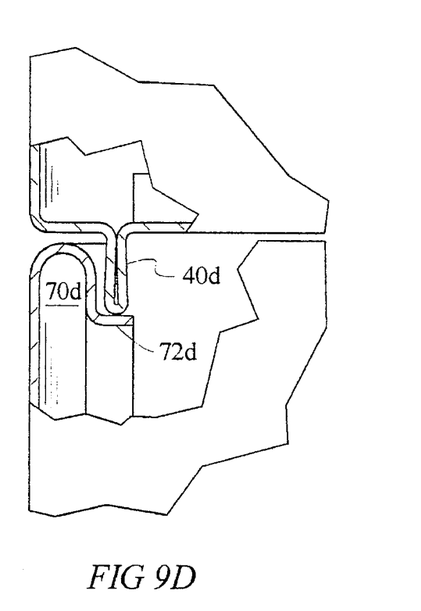
Figure 9E:
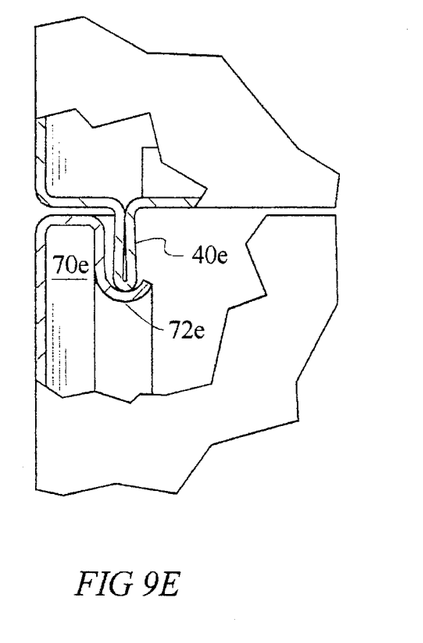
Figure 9F:
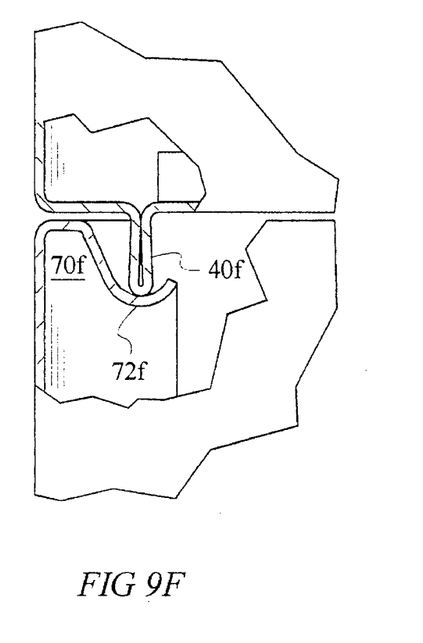
Figure 9G:
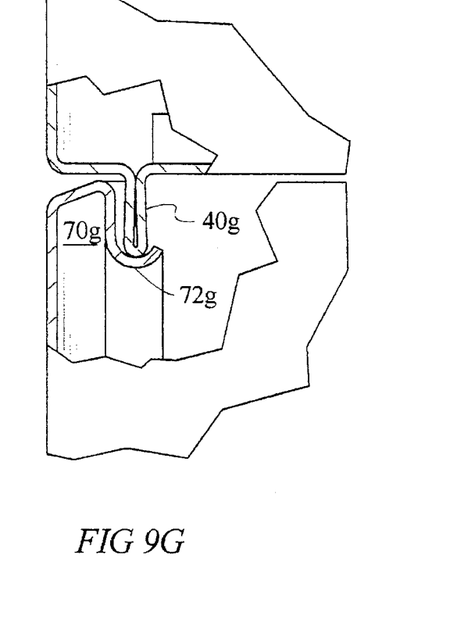
Figure 9H:
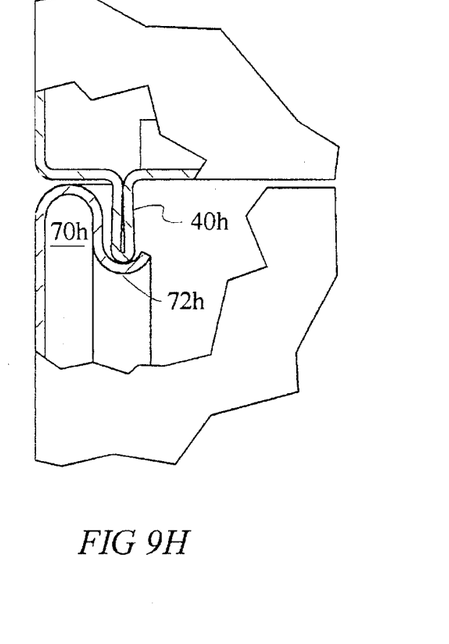

Also shown in FIG. 6 is a metal angle 74 which is affixed to the lower end of flange 72 and is adapted to frictionally engage the lower end of teardrop stiffener 40. The vertical dimension of metal angle 74 is best shown in FIG. 4. Flange 72 is partially truncated to provide clearance for metal angle 74, stopping approximately even with the centerline of stiffener 40. Referring briefly to FIG. 9A, above metal angle 74 flange 72 extends across the full width of stiffener 40. Metal angle 74 provides additional pry resistance by forming a solid engagement of the cabinet door side with the stiffener. This provides significant pry strength and mechanical cabinet integrity when the cabinet is subjected to pry forces.

Figure 7:
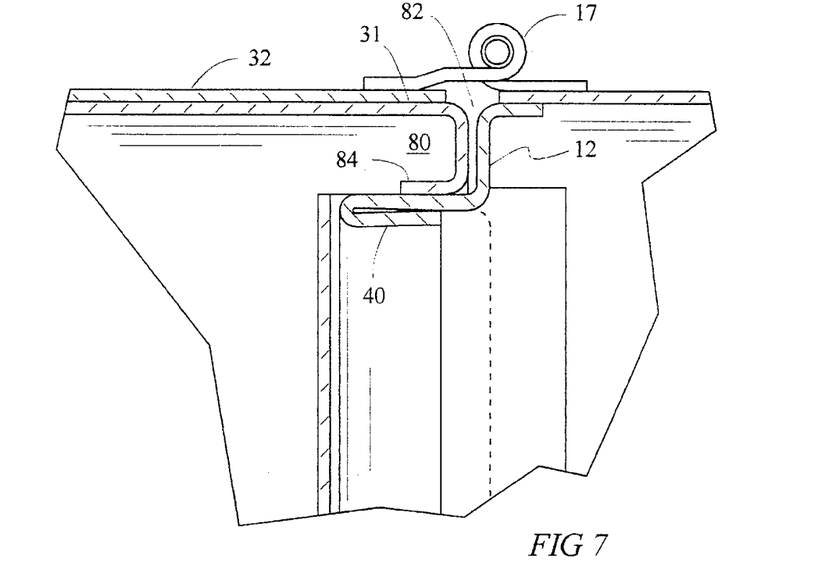
FIG. 7 is a cross-section view of the interface at the rear top edge of a cabinet door constructed according to the present invention.
Figure 8A:
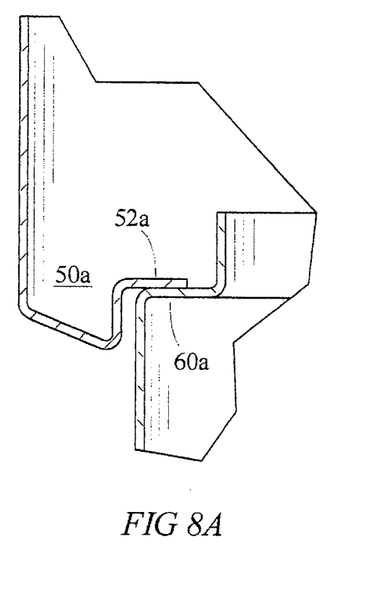
FIG. 8A-D are cross-sectional views of alternative embodiments of the lower front interface shown in FIG. 3.
Figure 8B:
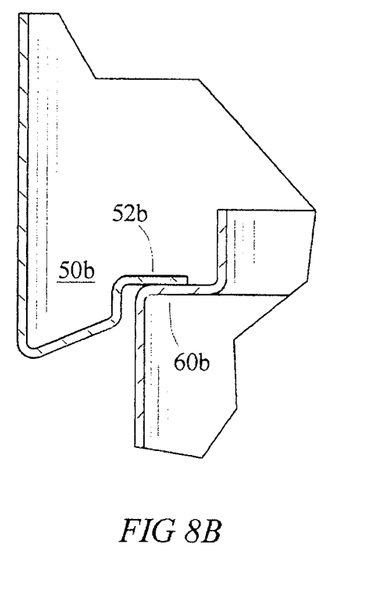
Figure 8C:
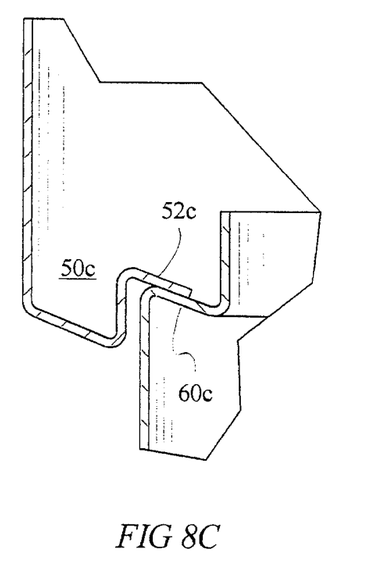
Figure 8D:
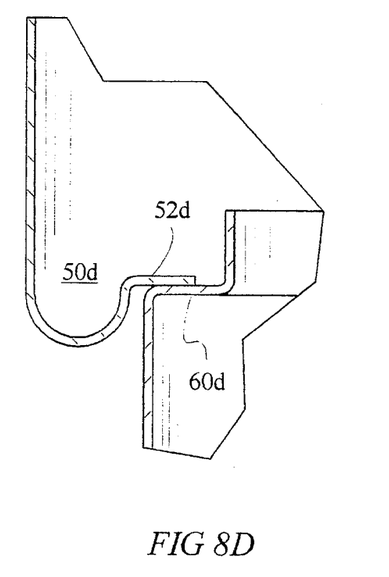

Referring now to FIG. 7, the interface between rear edge 31 and front plate 12 is shown. Unlike the lower and side edges, rear edge 31 includes only two 90° bends forming a shallow channel 80 defined by leg 84. Hinge 17 is positioned and shallow channel 80 is configured such that the clearance 82 between upper panel 32 and front plate 12 is approximately 60/1,000 (0.06) of an inch. When cabinet door 30 is in its closed position, leg 84 of channel 80 abuts teardrop stiffener 40.

Preferred dimensions for the channels formed around the edges of cabinet door 30 are 0.91 inches depth for channel 70, 80 around rear edges 31 and 39 and 0.50 inches depth for channel 50, 54 along lower edges 35 and 37. All channels are preferably 0.72 inches wide, and all flanges are preferably 0.50 inches wide. The present invention allows the sides and front of cabinet door 30 to be formed from a single piece of metal, as the channels and flanges can be formed by bending or pressing the edges of a flat sheet. Prior to bending and forming the channels, the corners of the flat sheet of metal must be notched so that the finished channels come together at the corners and do not result in excess material. Once the desired channels and bends have been formed, the seams at the corners of the door are welded. The finished cabinet door including channels and flanges can be coated as desired.

The cabinet door according to the present invention has been illustrated in terms of channels and flanges formed by 90° bends in the metal. One skilled in the art, however will understand that the crux of the invention encompasses similar channels and flanges formed by other than 90° bends. As illustrated in FIGS. 8A–D, lower front channel 50 can be formed by two or more bends whose angles total 180°, by a hemicircular bend, or any other channel-forming configuration. If non-right angles are used each angle should be between 60° and 120°. The angle at which shoulder 60 is formed in the sill can be varied, accompanied by a corresponding variation in the angle of flange 52. These variations are also applicable to the lower side interfaces. Likewise, as illustrated in FIGS. 9A–H, rear side channel 70 can be formed by a pair of bends whose angles total 180°, by a hemicircular bend, or any other channel-forming configuration, and the configuration of flange 72 can include an arucuate shape or other shape adapted to abut stiffener 40 in a manner that results in a sufficiently tamper-proof interface.

By forming the door in the manner disclosed above, a very rigid, tamper-proof door can be produced using fewer parts and fewer manufacturing steps. In addition, it has been found that the extra rigidity provided by the exotic bends in the formed door edges is sufficient to allow the door to be made of a thinner metal sheet, thereby further material costs.

While a preferred embodiment of the invention has been shown and described, modifications thereof can be made by one skilled in the art without departing from the spirit of the invention.

What is claimed is:

1. A tamper-resistant transformer cabinet, comprising:

a tank including a front plate, for housing a transformer, said front plate including upper, lower and side edges;

a riser extending from said front plate, said riser including two sides and a front;

a cabinet door including a rear top edge, two rear side edges, two lower side edges, and a lower front edge;

said door including an integral U-shaped channel along each of said edges, each channel having three sides, said channel sides being defined by said door, a channel bottom and an inner sidewall, respectively, said channel bottom being lowermost along said lower edges and rearmost along said rear edges when said door is in its closed position.

2. The transformer cabinet according to claim 1 wherein said channel along said lower front edge further includes a lower front flange extending inwardly and perpendicular to said sidewall.

3. The transformer cabinet according to claim 2 wherein said riser includes a shoulder along its upper edge and said front flange rests on said shoulder when said door is in its closed position.

4. The transformer cabinet according to claim 3 wherein said channel extends below said shoulder along said front and sides.

5. The transformer cabinet according to claim 3 wherein said channel extends below said shoulder along said front only.

6. The transformer cabinet according to claim 3 wherein each of said channels along said lower side edges includes a lower side flange extending inwardly and perpendicular to said sidewall.

7. The transformer cabinet according to claim 6 wherein a clearance is provided between said lower side flanges and said shoulder when said door is in its closed position.

8. The transformer cabinet according to claim 7, further including a resilient bumper member affixed to each lower side flange so as to occupy said clearance when said door is in its closed position.

9. The transformer cabinet according to claim 2 wherein said front plate includes a stiffening means adjacent its top and side edges and each of said rear side edges includes a rear side flange.

10. The transformer cabinet according to claim 9, further including a metal angle member affixed to said rear side flange, said metal angle and said rear side channel defining a second channel having its opening oriented to receive and engage said stiffening means when said door is closed.

11. The transformer cabinet according to claim 9 wherein said rear side flange frictionally engages said stiffening means when said door is in its closed position.

12. The transformer cabinet according to claim 11 wherein said channel formed along said rear top edge includes a leg that abuts said stiffening means when said door is in its closed position.

13. The transformer cabinet according to claim 11 wherein said riser includes a shoulder along its upper edge and said front flange rests on said shoulder when said door is in its closed position.

14. The transformer cabinet according to claim 13 wherein each of said channels along said lower side edges includes a lower side flange extending inwardly and perpendicular to said sidewall.

15. The transformer cabinet according to claim 14 wherein a clearance is provided between said lower side flange and said shoulder when said door is in its closed position.

16. The transformer cabinet according to claim 15 wherein said channel formed along said lower side edges and said lower front edge is shallower than said channel formed along said rear side edges.

17. The transformer cabinet according to claim 15, further including a resilient bumper member affixed to said lower side flange so as to occupy said clearance when said door is in its closed position.

18. The transformer cabinet according to claim 15, further including a metal angle for frictionally engaging said stiffening means, said metal angle being affixed to said rear side flange.

19. The transformer cabinet according to claim 1 wherein each of said channels is formed by at least two angles that total 180°.

20. The transformer cabinet according to claim 1 wherein said channels are hemicircular.

* * * * *